(12) United States Patent
Latcha et al.

(10) Patent No.: US 9,482,256 B2
(45) Date of Patent: Nov. 1, 2016

(54) MECHANISM FOR RAPID DE-COUPLING OF LOAD BEARING STRUCTURES

(71) Applicant: Oakland University, Rochester, MI (US)

(72) Inventors: Michael A. Latcha, Redford, MI (US); Sayed A. Nassar, Northville, MI (US); Mehmet H. Uras, Ann Arbor, MI (US)

(73) Assignee: Oakland University, Rochester, MI (US)

( * ) Notice: Subject to any disclaimer, the term of this patent is extended or adjusted under 35 U.S.C. 154(b) by 168 days.

(21) Appl. No.: 13/828,965

(22) Filed: Mar. 14, 2013

(65) Prior Publication Data

US 2014/0178120 A1 Jun. 26, 2014

Related U.S. Application Data

(60) Provisional application No. 61/745,096, filed on Dec. 21, 2012.

(51) Int. Cl.
*F16B 19/00* (2006.01)
*F41H 7/04* (2006.01)
*F42B 3/00* (2006.01)

(52) U.S. Cl.
CPC .............. *F16B 19/00* (2013.01); *F41H 7/042* (2013.01); *F41H 7/046* (2013.01); *F42B 3/006* (2013.01); *Y10T 403/1633* (2015.01)

(58) Field of Classification Search
CPC ........... Y10T 403/1633; Y10T 403/22; Y10T 24/25466; Y10T 403/1641; F42B 3/006; F42B 3/22; F42B 3/127; F42B 3/26; F16B 31/005; F16B 19/00; F41H 7/042; F41H 7/046
See application file for complete search history.

(56) References Cited

U.S. PATENT DOCUMENTS 2,732,765 A * 1/1956 Boyd .............................. 89/1.57
3,012,810 A * 12/1961 Tenney ....................... 294/82.29

(Continued)

FOREIGN PATENT DOCUMENTS

DE 102008032386 A1 * 1/2010 ............... F42B 3/00
DE 102012107580 A1 * 2/2014
WO WO 2012119628 A1 * 9/2012

OTHER PUBLICATIONS

Canadian Office Action for Application No. 2,833,692 dated Mar. 30, 2015.

(Continued)

*Primary Examiner* — Gregory Binda
*Assistant Examiner* — Matthew R McMahon
(74) *Attorney, Agent, or Firm* — Harness, Dickey & Pierce, P.L.C.

(57) ABSTRACT

A de-coupling mechanism includes a link slidably received in a link aperture of a bracket. A pin is slidably received in a pin bore of the link and a receiving bore of the bracket. A first block is connected to the bracket and includes an initiator receiving passage in communication with the pin bore. An initiator is positioned in the initiator receiving passage and retained against a connecting passage edge and oppositely contacts an end face of a cap connected to the first block. A second block connected to the bracket includes a longitudinal channel having a channel diameter larger than a pin diameter so the pin is freely displaceable into the longitudinal channel. An end face of a retaining cap is connected to a second block end wall. The retaining cap includes a stepped portion having a step diameter smaller than the channel diameter and the pin diameter.

24 Claims, 6 Drawing Sheets

(56) References Cited

U.S. PATENT DOCUMENTS

| | | | |
|---|---|---|---|
| 3,024,592 A * | 3/1962 | Leaman | F42B 3/006 |
| | | | 114/221 A |
| 3,084,597 A * | 4/1963 | Beyer | 89/1.14 |
| 3,094,928 A * | 6/1963 | Costley et al. | 102/407 |
| 3,114,962 A * | 12/1963 | Brown | F16B 31/005 |
| | | | 269/15 |
| 3,139,660 A * | 7/1964 | Foster et al. | 403/15 |
| 3,215,220 A * | 11/1965 | Schoeffler | 180/270 |
| 3,884,436 A * | 5/1975 | Poehlmann | 244/122 A |
| 3,888,158 A * | 6/1975 | Temple | F42B 3/006 |
| | | | 89/1.14 |
| 4,008,780 A * | 2/1977 | Bendler et al. | 297/480 |
| 4,307,858 A * | 12/1981 | Naab et al. | 244/151 B |
| 5,029,368 A * | 7/1991 | Baum et al. | 24/602 |
| 5,205,665 A * | 4/1993 | Aronne | 403/15 |
| 5,218,165 A | 6/1993 | Cornelius et al. | |
| 5,242,258 A * | 9/1993 | Weyer | 414/723 |
| 6,662,702 B1 * | 12/2003 | Vidot | B60T 7/065 |
| | | | 102/530 |
| 7,836,810 B2 * | 11/2010 | Meyer | 89/36.17 |
| 8,033,573 B2 * | 10/2011 | Beki et al. | 280/756 |
| 9,151,578 B2 * | 10/2015 | Enzmann et al. | |

OTHER PUBLICATIONS

Chinese Office Action for Application No. 201310698998.2 dated Jul. 1, 2015, and its English translation thereof.
Canadian Office Action for Application No. 2,833,692 dated Nov. 18, 2015.
Chinese Office Action for Chinese Application No. 201310698998.2 dated Feb. 1, 2016, and its English translation.

* cited by examiner

MECHANISM FOR RAPID DE-COUPLING OF LOAD BEARING STRUCTURES

CROSS-REFERENCE TO RELATED APPLICATIONS

This application claims the benefit of U.S. Provisional Application No. 61/745,096, filed on Dec. 21, 2012. The entire disclosure of the above application is incorporated herein by reference.

FIELD

The present disclosure relates to a mechanism for de-coupling a load-bearing structure from a second structure.

BACKGROUND

This section provides background information related to the present disclosure which is not necessarily prior art.

Structural members can be coupled using known coupling mechanisms such as brackets, links and pins. Vehicles such as military personnel transports or weaponized personnel carrying vehicles include such coupling mechanisms to connect wall, floor and/or ceiling structures to interior structures. In certain instances, a rapidly applied load such as from a bomb blast, a collision, or the like is received in a first portion of the structure such as to the floor, walls and/or ceiling of the vehicle. It is desirable to de-couple the first structure receiving the rapidly applied load from a second structure supporting the personnel to prevent the load from being transferred to the personnel. Under such rapid load conditions, it is anticipated that a de-coupling action must be accomplished in approximately 400 microseconds or less to minimize or prevent load transfer to the inhabitants of the vehicle. Known methods to de-couple such structures cannot perform the de-coupling action in a time frame of 400 microseconds or less.

SUMMARY

This section provides a general summary of the disclosure, and is not a comprehensive disclosure of its full scope or all of its features.

According to several aspects, a de-coupling mechanism includes a link slidably received in a link aperture created in a bracket. A pin when slidably received in each of a pin bore created in the link and a receiving bore created in the bracket releasably retains the link. A first block connected to the bracket includes an initiator receiving passage in communication with the pin bore. An initiator is positioned in the receiving passage and is retained against an edge of the connecting passage. The initiator when actuated releases a pressurized gas acting to displace the pin out of the pin bore to thereby release the link from the de-coupling mechanism.

According to other aspects, a de-coupling mechanism includes a link slidably received in a link aperture created in a bracket. A pin is slidably received in each of a pin bore created in the link and a receiving bore created in the bracket. A first block is connected to the bracket. The first block includes an initiator receiving passage in communication with a longitudinal passage via a connecting passage. An initiator is positioned in the initiator receiving passage and is retained against an edge of the connecting passage and oppositely contacts an end face of a cap connected to the first block and facing oppositely away from the first block. A second block is connected to the bracket and is oppositely positioned about the bracket with respect to the first block. The second block includes a longitudinal channel having a channel diameter larger than a pin diameter such that the pin is freely displaceable into the longitudinal channel. An end face of a retaining cap is connected to an end wall of the second block. The retaining cap includes a stepped portion having a step diameter smaller than the channel diameter and smaller than the pin diameter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
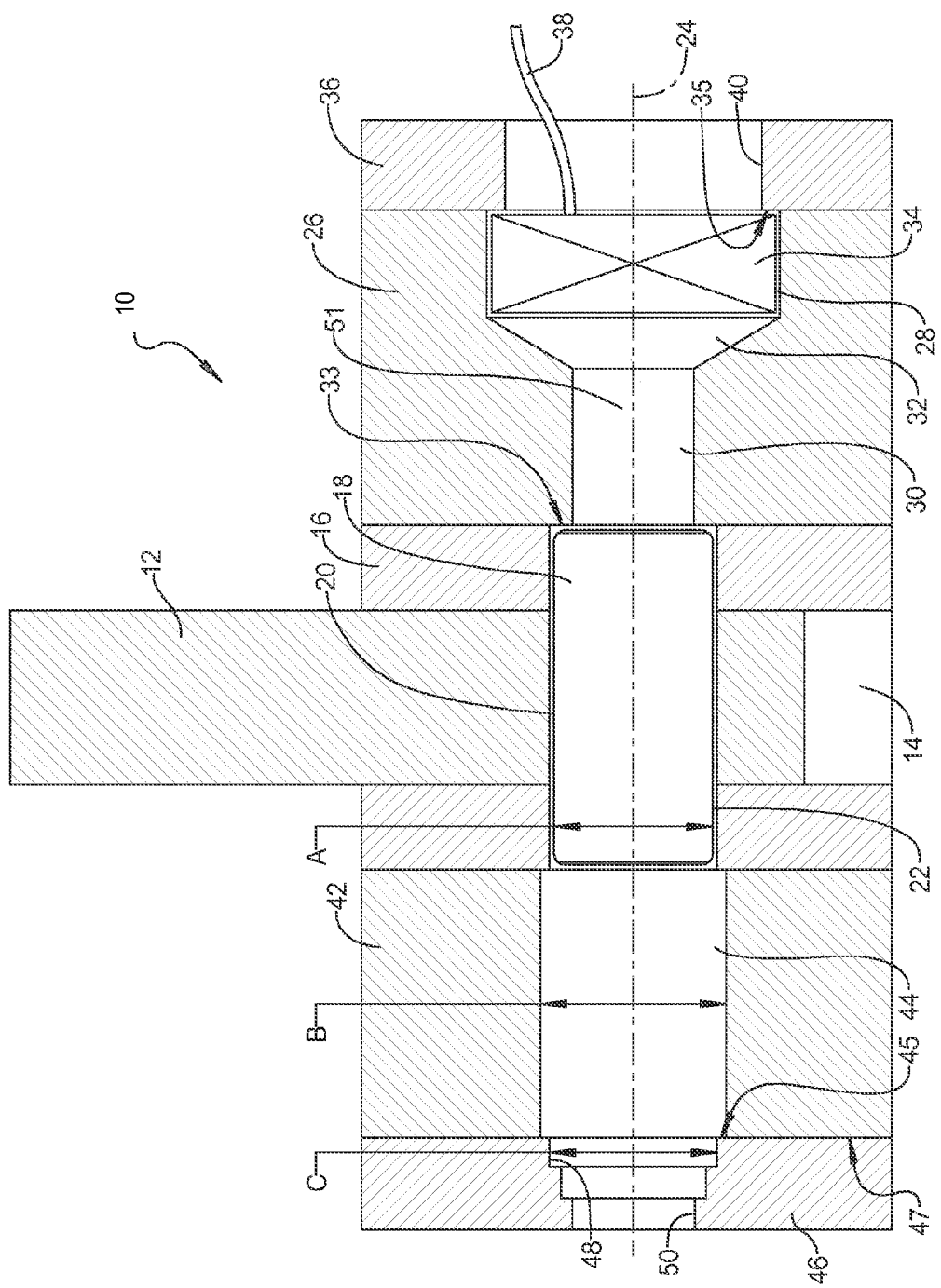
FIG. 1 is a cross sectional front elevational view taken at section 1 of FIG. 4, showing a mechanism for rapid de-coupling of load bearing structures of the present disclosure.

Referring to FIG. 1, a de-coupling mechanism 10 includes a link 12 which is slidably received in a cavity or bore defining a link aperture 14 created in a bracket 16. A pin 18 is slidably received in each of a pin bore 20 created in link 12 and a receiving bore 22 created in the bracket 16 defining a first position of link 12. Pin 18 is coaxially aligned with respect to a longitudinal axis 24 of the pin bore 20 and the receiving bore 22. A diameter "A" of pin 18 is selected to provide a sliding fit within both the pin bore 20 and the receiving bore 22.

Bracket 16 is connected to a first block 26. First block 26 includes an initiator receiving passage 28 which is in communication with a longitudinal passage 30 via a connecting passage 32. Connecting passage is shown having a tapering or conical shape, but can have any geometry adapted to change from a size of initiator receiving passage 28 to longitudinal passage 30. Longitudinal passage 30 has a diameter smaller than the diameter "A" of pin 18 such that pin 18 cannot displace into longitudinal passage 30. Pin 18 can therefore contact an end wall 33 of first block 26 at the opening of longitudinal passage 30.

An initiator 34 such as an automobile vehicle airbag initiator is positioned in receiving passage 28 and retained against the opening or edge of the smaller connecting passage 32 and can oppositely contact an end face 35 of an end cap 36 which is connected to first block 26 facing toward first block 26. A communication lead 38 of initiator 34 extends out of a cap aperture 40 created in end cap 36 which receives an initiation signal to activate initiator 34. According to several aspects, each of the initiator receiving passage 28, longitudinal passage 30, connecting passage 32, and cap aperture 40 are also coaxially aligned with respect to longitudinal axis 24. As an example only, initiators 34 can be 535 THPP 50 ZPP air bag initiators manufactured by Autoliv, Inc. of Promontory, Utah.

Oppositely positioned about bracket 16 with respect to first block 26 is a second block 42 connected to bracket 16. Second block 42 includes a longitudinal channel 44 that has a channel diameter "B" larger than diameter "A" of pin 18 such that pin 18 can be freely received within longitudinal channel 44. An end face 45 of a retaining cap 46 is connected to an end wall 47 of second block 42. Retaining cap 46 includes a stepped portion 48 having a step diameter "C" which is smaller than channel diameter "B" and therefore smaller than the diameter "A" of pin 18. An open passage 50 connects longitudinal channel 44 to atmosphere. Each of the longitudinal channel 44 and stepped portion 48 are coaxially aligned with respect to longitudinal axis 24.

In the normal, connected condition depicted in FIG. 1, pin 18 provides a structural connecting link to join link 12 to bracket 16. Subsequently, when an initiating signal is received by initiator 34, initiator 34 activates and issues a high pressure gas 51 into longitudinal passage 30. High pressure gas 51 slidably displaces pin 18 which will be described in better detail in reference to FIG. 2, thereby allowing link 12 to separate from bracket 16.

Referring to FIG. 2 and again to FIG. 1, the displaced condition of de-coupling mechanism 10 occurs following activation of initiator 34 and discharge of high pressure gas 51. High pressure gas 51 fills connecting passage 32 and longitudinal passage 30 and acts against a first end face 52 of pin 18 to start sliding displacement of pin 18 in a displacement direction "D". As pin 18 slides in the displacement direction "D", the high pressure gas 51 expands to fill receiving bore 22 and pin bore 20 and continues to push pin 18 until a second end face 54 of pin 18 directly contacts stepped portion 48 stopping pin travel. During sliding displacement of pin 18, air at atmospheric pressure is forced out of longitudinal channel 44 and out through open passage 50 to atmosphere, thereby reducing resistance to sliding motion of pin 18.

A length "E" of pin 18 is less than a distance "F" between stepped portion 48 and an outer face 56 of link 12. This ensures pin 18 completely exits pin bore 20 of link 12 when pin 18 reaches the contact position with stepped portion 48. The clearance provided by channel diameter "B" when pin 18 is received in longitudinal channel 44 ensures pin 18 does not bind during sliding displacement.

Figure 2:
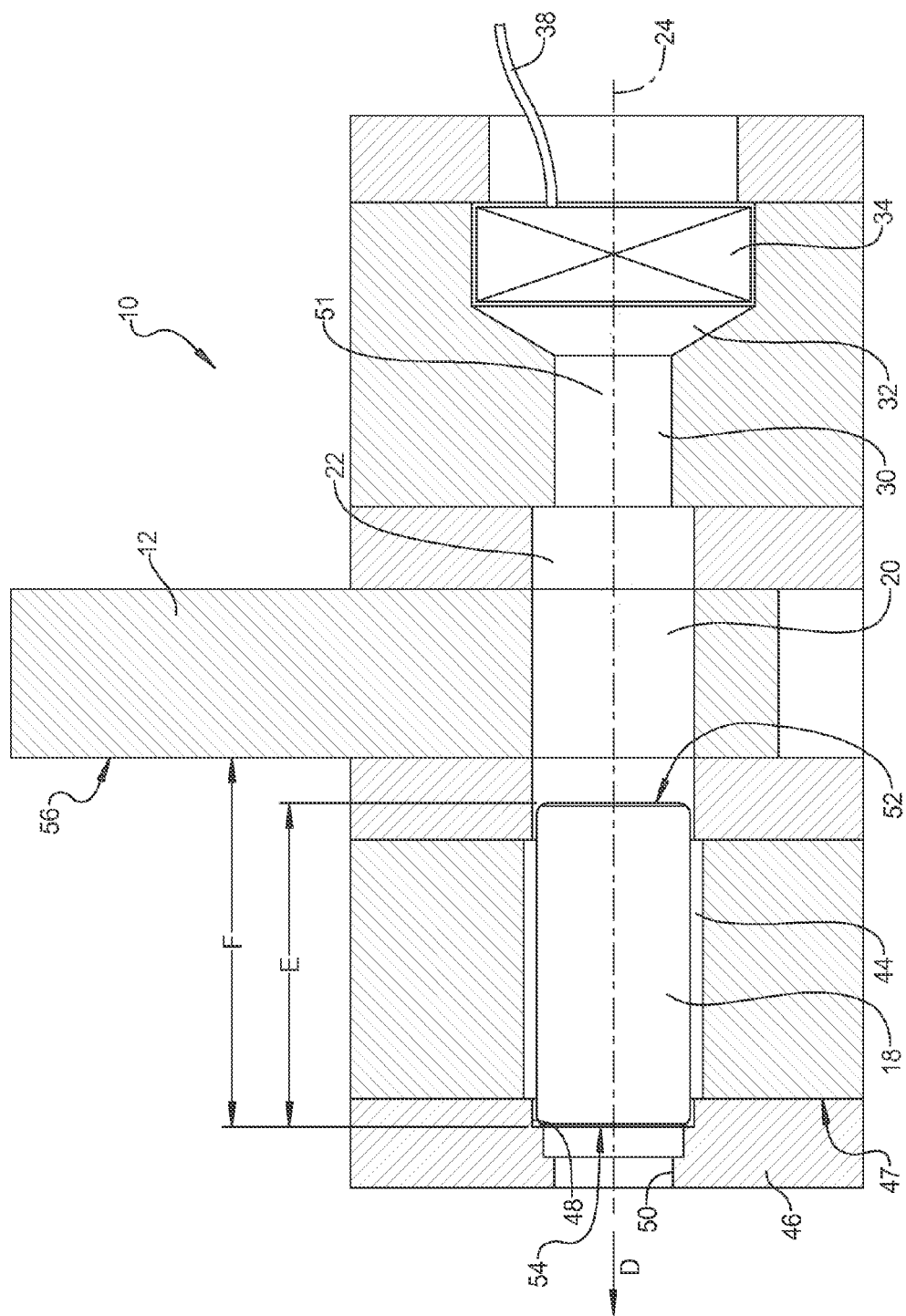
FIG. 2 is a cross sectional front elevational view similar to FIG. 1, further showing the pin displaced by energy released from the initiator.

Referring to FIG. 3 and again to FIGS. 1 and 2, after reaching the displaced condition of FIG. 2, pin 18 has completely exited pin bore 20 of link 12 in displacement direction "D", thereby allowing link 12 to displace further into link aperture 14 of bracket 16 in a link displacement direction "G" to a second or displaced position of link 12. According to several aspects, link displacement direction "G" is transverse to longitudinal axis 24. It is noted that depending on the direction of force acting on link 12, link 12 can also exit link aperture 14 in a second link displacement direction "H" which is oppositely directed with respect to link displacement direction "G".

Figure 3:
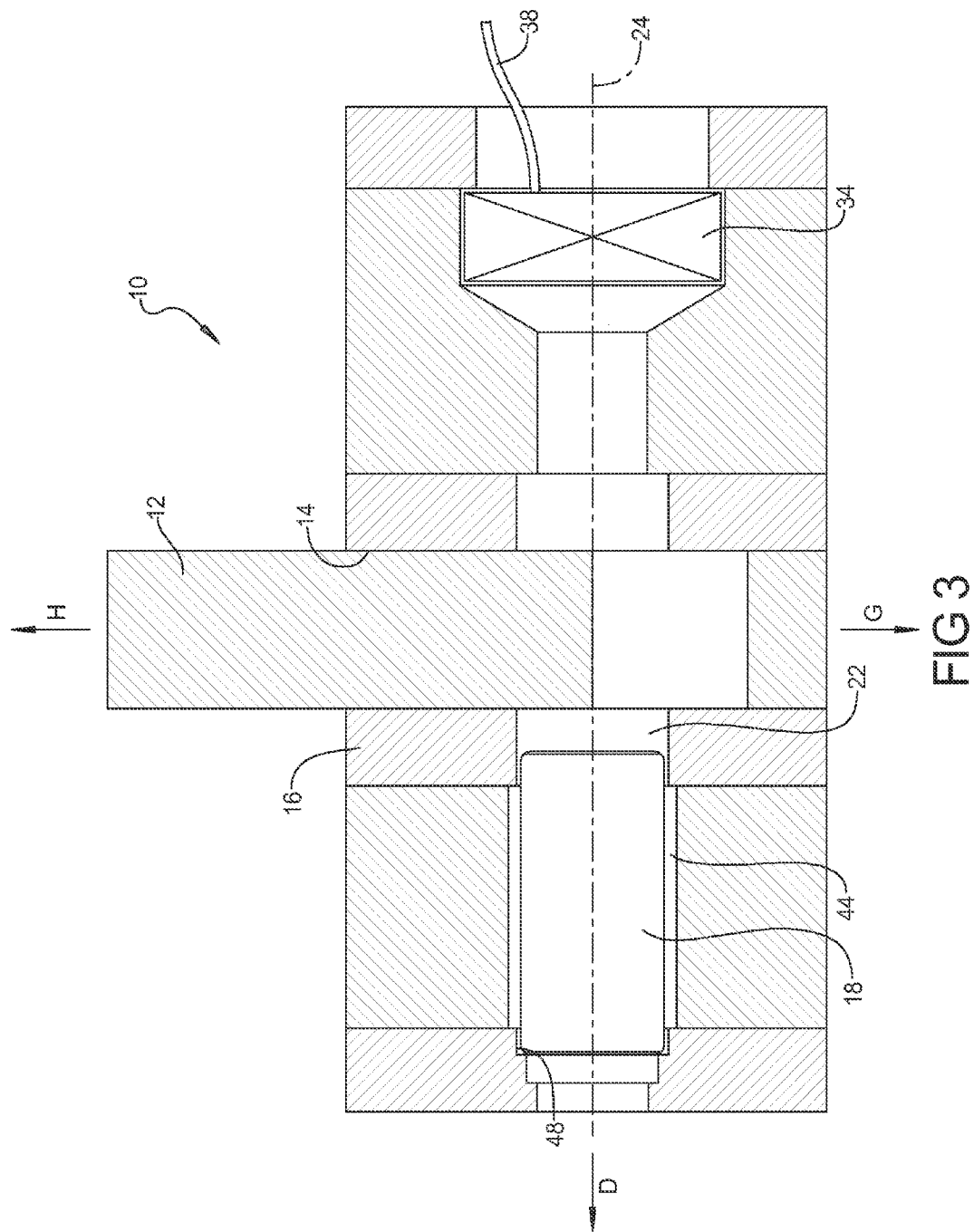
FIG. 3 is a cross sectional front elevational view similar to FIG. 2, further showing the link after displacement from the bracket.
Figure 4:
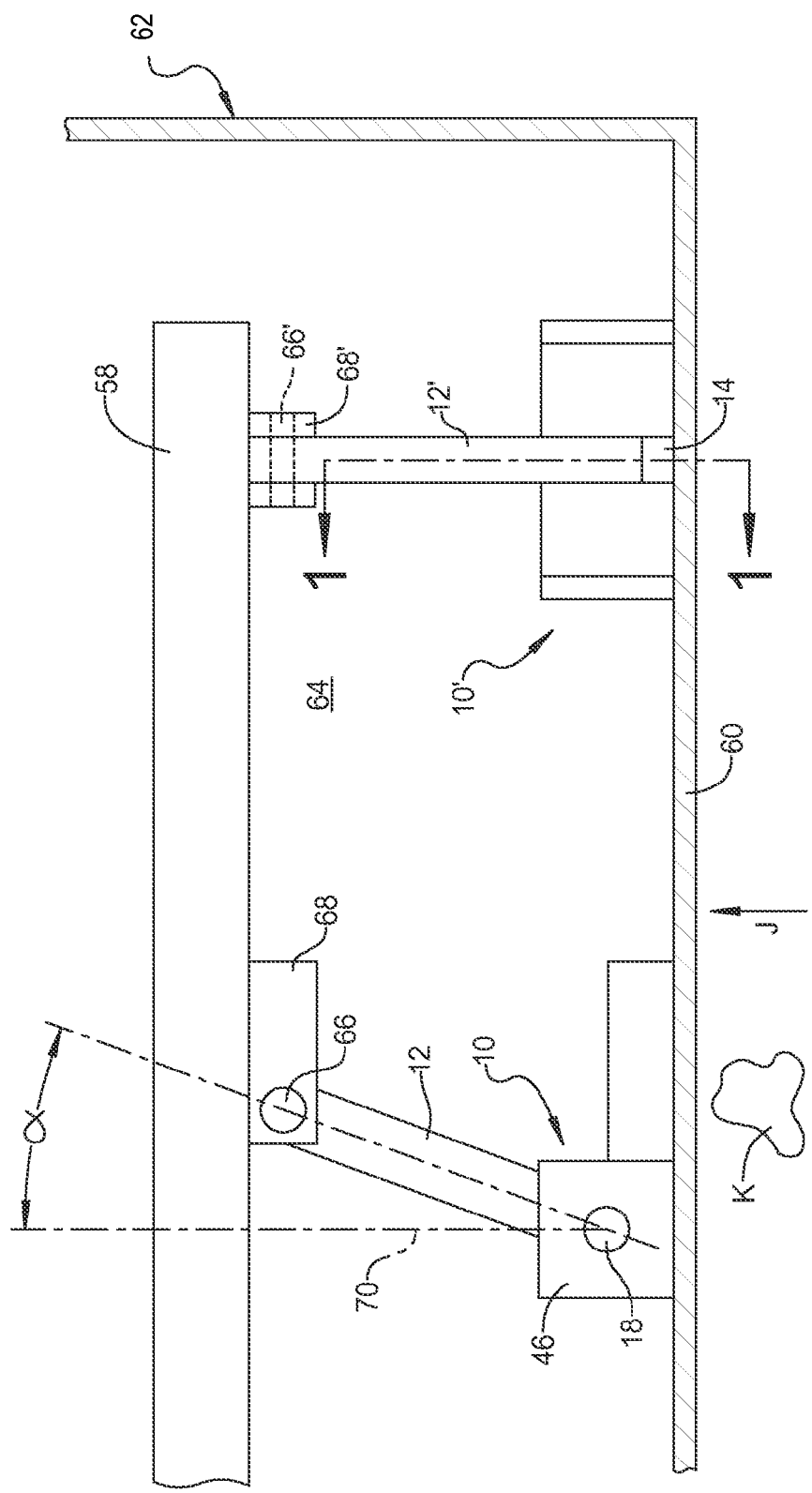
FIG. 4 is a partial cross sectional side elevational view of a vehicle having multiple mechanisms for rapid de-coupling of load bearing structures of the present disclosure.

Referring to FIG. 4 and again to FIGS. 1-3, an exemplary use of de-coupling mechanisms 10 is presented which utilizes multiple de-coupling mechanisms 10, 10' supporting a load bearing vehicle false floor structure 58 to a vehicle floor structure 60 of a vehicle 62. When links 12, 12' are connected, the de-coupling mechanisms 10, 10' create and maintain a clearance space 64 between vehicle false floor structure 58 and vehicle floor structure 60. According to several aspects, de-coupling mechanisms 10, 10' are positioned about a periphery of vehicle floor structure 60, and a quantity of de-coupling mechanisms 10, 10' used can vary depending on a static load of vehicle false floor structure 58, equipment and personnel supported by vehicle false floor structure 58. In several aspects, one de-coupling mechanism 10 is used for each 100 pounds of static load. The de-coupling mechanisms 10, 10' can also be oriented at different angles with respect to each other, such as the 90 degree different orientation shown for de-coupling mechanisms 10, 10'.

Each of the de-coupling mechanisms 10, 10' has its link 12, 12' rotatably connected using a second pin 66, 66' to a connector 68, 68' such as a clevis which is fixedly connected to the vehicle false floor structure 58. Each of the links 12, 12' is oriented at an angle alpha ($\alpha$) with respect to an axis 70. Axis 70 is oriented transverse to the vehicle false floor structure 58 and vehicle floor structure 60. Orientation angle $\alpha$ allows the links 12, 12' to freely rotate with respect to second pins 66, 66' after the pin 18 of each of the de-coupling mechanisms 10, 10' is displaced. Rotation of links 12, 12' allows vehicle floor structure 60 to displace in an upward direction "J" due to a force or load "K" such as from a bomb blast received in the upward direction "J" to vehicle floor structure 60. A force transmission path from load "K" to the occupants of vehicle 62 is therefore broken. According to several aspects, orientation angle $\alpha$ is approximately 20 degrees, however angle $\alpha$ can be any angle ranging between approximately 10 to 80 degrees.

Figure 5:
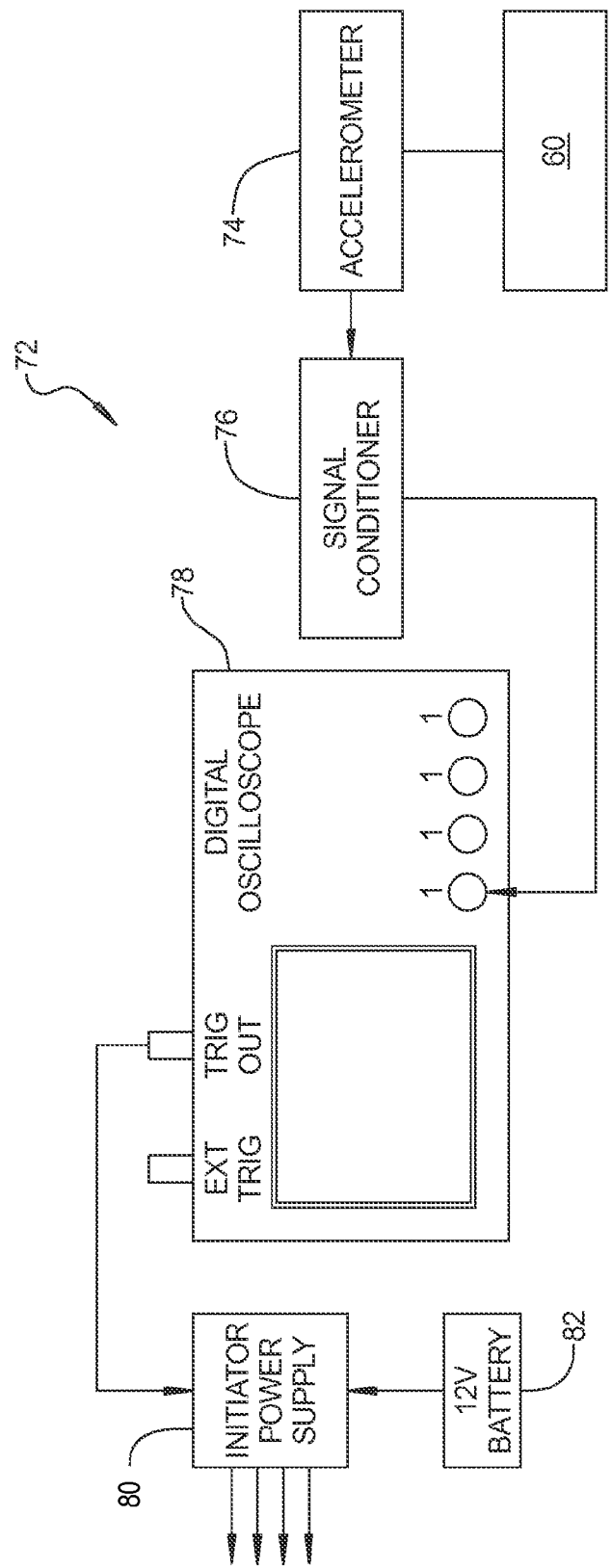
FIG. 5 is a block diagram of a system for operating mechanisms for rapid de-coupling of load bearing structures of the present disclosure.

Referring to FIG. 5 and again to FIGS. 1-4, a block diagram of an exemplary operation system 72 for controlling one or more de-coupling mechanisms 10 includes at least one and according to several aspects multiple accelerometers 74, such as Model 40A accelerometers provided by Measurement Specialties Inc. of Hampton, Va. Accelerometers 74 are connected to the vehicle floor structure 60. The output of accelerometers 74 is input to a signal conditioner 76 provided for example as a model 101 signal conditioner manufactured by Measurement Specialties Inc. of Hampton, Va. The output of signal conditioner 76 is input to a device such as a digital oscilloscope 78 provided for example as model DSO-X 3024A manufactured by Agilent Technologies, Inc. of Santa Clara, Calif. Signals from the digital oscilloscope 78 are forwarded to an initiator power supply 80 which sends initiation signals to the individual de-coupling mechanisms 10. A power source such as a battery 82 provides power for the components of operation system 72.

When a signal representing a threshold acceleration value is sensed by accelerometers 74, the initiator power supply 80 actuates the individual initiators 34 of the de-coupling mechanisms 10. According to several aspects, a total time period between recognition of the threshold acceleration value, signaling of the initiators 34, until the second end face 54 of pins 18 makes contact with stepped portion 48 is approximately 400 microseconds or less, and de-coupling mechanisms 10 of the present disclosure have attained cycle times of approximately 200 microseconds. This time period provides adequate recognition and de-coupling times to separate vehicle false floor structure 58 from vehicle floor structure 60 of vehicle 62, for example during a weapon detonation event.

Material used for the component parts of de-coupling mechanisms 10 of the present disclosure is not limiting. According to several non-limiting aspects, the link 12, bracket 16, the first and second blocks 26, 42, the end cap 36 and the retaining cap 46 can be aluminum to minimize assembly weight, such as 7075-T6 aluminum. Material for the pin 18 is selected from a material stronger/harder than the aluminum material and according to several aspects is titanium.

Figure 6:
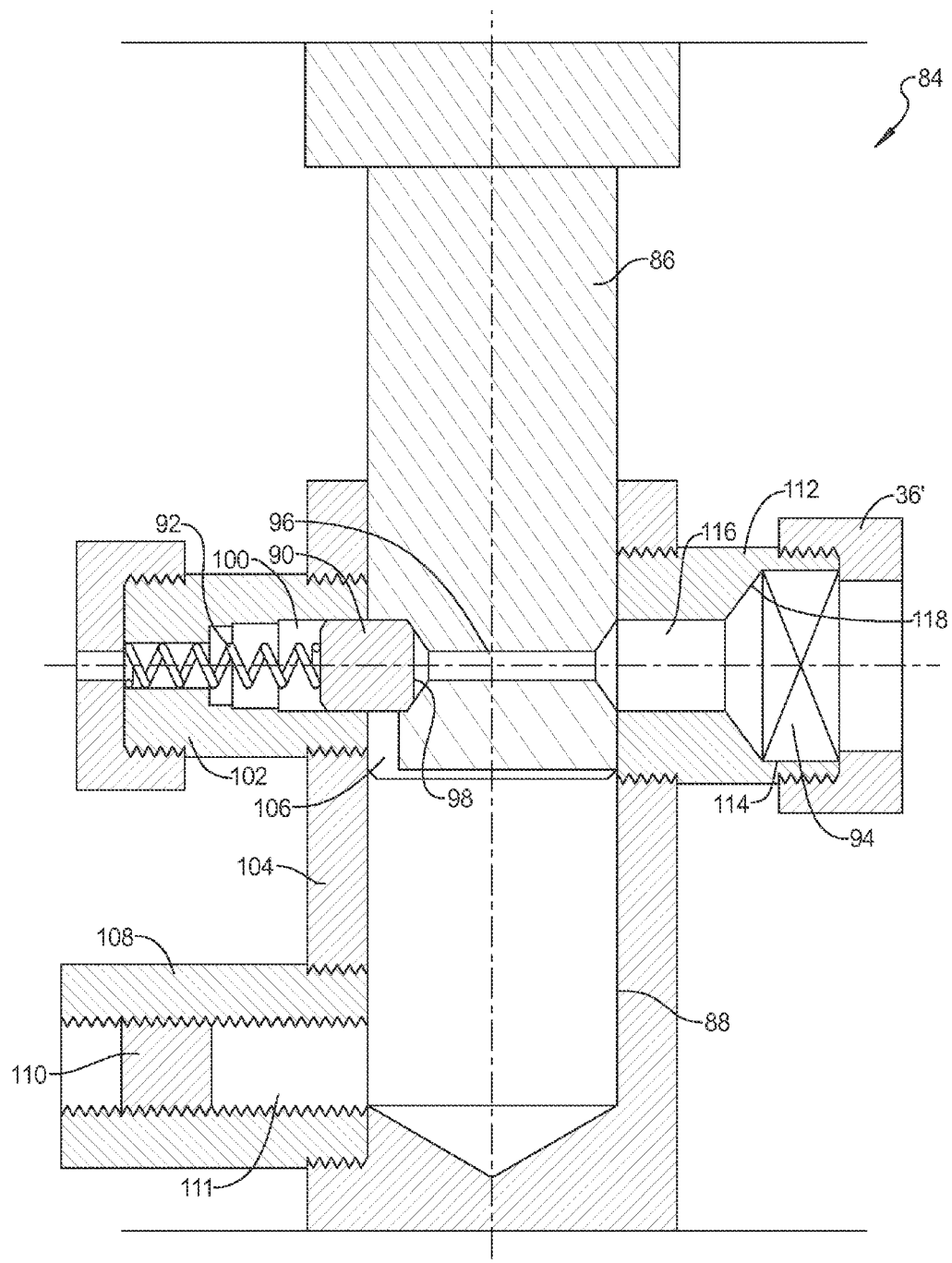
FIG. 6 is a cross section front elevational view similar to FIG. 1.

Referring to FIG. 6 and again to FIGS. 1-5, according to further aspects, a de-coupling mechanism 84 is modified from de-coupling mechanism 10, therefore only the differences will be further discussed. De-coupling mechanism 84 includes a link or plunger 86 contained within a link aperture defining a bracket or cylinder 88 that is held rigidly in place by one or more pins 90 defining a first position of the plunger 86. Each pin 90 is held in place by a spring 92. Upon firing of an initiator 94 retained by end cap 36', high pressure gas acts through an aperture 96 created through the plunger 86 on a face 98 of the pin 90, compressing spring 92 and forcing the pin 90 into a stepped cavity 100 of a spring retention member 102, which is connected to a cylinder wall 104 of cylinder 88, thereby capturing pin 90 securely. The stepped cavity 100 further acts as a positive retainer for the pin 90 during normal operation. The plunger 86 is then free to move into or out of cylinder 88, decoupling the previously rigid connection created by pin 90 between plunger 86 to spring retention member 102.

Optionally, as the pin 90 moves out of contact with plunger 86, the remaining high pressure gas from the initiator 94 can be vented through channel 106 created in the plunger 86 into the cylinder 88, allowing the high pressure gas to control the movement of the plunger 86. Optionally, a tube 108 having an axially adjustable plug 110, (which can also be replaced with a pressure relief valve, not shown), allows the characteristics of this high pressure cylinder/plunger system to be tuned to a specific application. The position of plug 110 in a passageway 111 of the tube 108 provides an adjustable volume of the passageway 111 which receives a portion of the high pressure gas and thereby acts as a shock absorber during sliding motion of the plunger 86. The system shown is used to control the motion of plunger 86 as it moves into cylinder 88. Optionally the system can be configured to control plunger 86 as it moves out of cylinder 88. Similar to de-coupling mechanism 10, de-coupling mechanism 84 includes a first block 112 connected to the member or cylinder 88. The first block 112 includes an initiator receiving passage 114 in communication with the pin bore via a passage 116. The initiator 94 is positioned in the receiving passage 114 and is retained against an edge 118 of the connecting passage 114.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A de-coupling mechanism, comprising:
    a link slidably received in a link aperture created in a member;
    a pin slidably received in each of a pin bore created in the link and a receiving bore created in the member to releasably retain the link in a first position;
    a first block connected to the member, the first block including an initiator receiving passage in communication with the pin bore;
    an initiator positioned in the initiator receiving passage and retained against an edge of where a connecting passage and the initiator receiving passage meet, the initiator when actuated releasing a pressurized gas displacing the pin out of the pin bore into a longitudinal channel, thereby releasing the link from the first position, wherein the longitudinal channel has a diameter greater than a diameter of the pin bore; and
    a retaining cap having a stepped portion and a step diameter smaller than the diameter of the longitudinal channel and smaller than a diameter of the pin, the pin being retained by the retaining cap upon displacement from the pin bore, wherein an end face of the retaining cap connects to an end wall of a second block of the de-coupling mechanism and the retaining cap includes a passage to atmosphere opposite the end wall of the second block prior to displacement of the pin,
    wherein the connecting passage is between the initiator receiving passage and the pin bore.

2. The de-coupling mechanism of claim 1, further including an end cap connected to the first block, the initiator contacting an end face of the end cap to retain the initiator.

3. The de-coupling mechanism of claim 1, wherein the second block connects to the member and is oppositely positioned about the member with respect to the first block, the second block including the longitudinal channel.

4. The de-coupling mechanism of claim 3 wherein the retaining cap is formed of a material softer than the pin.

5. The de-coupling mechanism of claim 1 wherein the connecting passage has a smaller diameter than the initiator receiving passage.

6. The de-coupling mechanism of claim 5 wherein the smaller diameter of the connecting passage meets a larger diameter of the initiator receiving passage to form the edge.

7. The de-coupling mechanism of claim 1 wherein the connecting passage, the initiator receiving passage, and the pin bore are coaxially aligned.

8. The de-coupling mechanism of claim 7 wherein the connecting passage has a smaller diameter than the initiator receiving passage.

9. The de-coupling mechanism of claim 8 wherein the smaller diameter of the connecting passage meets a larger diameter of the connecting passage to form the edge.

10. A de-coupling mechanism, comprising:
    a link slidably received in a link aperture created in a bracket;
    a pin slidably received in each of a pin bore created in the link and a receiving bore created in the bracket to releasably retain the link in a link first position;
    a first block connected to the bracket, the first block including an initiator receiving passage in communication with the pin bore;
    an initiator positioned in the initiator receiving passage and retained against an edge where a connecting passage and the initiator receiving passage meet, the initiator when actuated releasing a pressurized gas acting to displace the pin out of the pin bore into a longitudinal channel, and thereby releasing the link from a first position to freely slide with respect to the bracket, wherein the longitudinal channel has a diameter greater than a diameter of the pin bore; and
    a retaining cap having a stepped portion and a step diameter small than the diameter of the longitudinal channel and smaller than a diameter of the pin, the pin being retained by the retaining cap upon displacement from the pin bore, wherein an end face of the retaining cap connects to an end wall of a second block of the de-coupling mechanism and the retaining cap includes a passage to atmosphere when the pin is located in the pin bore,
    wherein the connecting passage is between the initiator receiving passage and the pin bore and wherein the connecting passage, the initiator receiving passage, and the pin bore are coaxially aligned.

11. The de-coupling mechanism of claim 10, wherein the initiator oppositely contacts an end face of a cap connected to the first block, the cap facing oppositely away from the first block.

12. The de-coupling mechanism of claim 10, wherein the second block connects to the bracket and is oppositely positioned about the bracket with respect to the first block, the second block including the longitudinal channel.

13. The de-coupling mechanism of claim 12, wherein a communication lead of the initiator extends out of a cap aperture created in a cap attached to the first block.

14. The de-coupling mechanism of claim 12, wherein the pin is coaxially aligned with respect to a longitudinal axis of the pin bore and the receiving bore.

15. The de-coupling mechanism of claim 12, wherein each of the initiator receiving passage, the longitudinal channel, the connecting passage, and a cap aperture are coaxially aligned with respect to a longitudinal axis.

16. The de-coupling mechanism of claim 12, wherein the retaining cap is formed of a material softer than the pin.

17. The de-coupling mechanism of claim 10, wherein a diameter of the pin is selected to provide a sliding fit within both the pin bore and the receiving bore.

18. The de-coupling mechanism of claim 10, wherein the connecting passage has a tapering or conical shape transitioning a size of the initiator receiving passage to a size of a longitudinal passage connecting the connecting passage to the pin bore.

19. The de-coupling mechanism of claim 18, wherein the longitudinal passage has a diameter smaller than a diameter of the pin such that the pin cannot displace into the longitudinal passage.

20. The de-coupling mechanism of claim 10, wherein the pin directly contacts an end wall of the first block when the de-coupling mechanism is in a coupled condition defined when the pin is simultaneously positioned in both the pin bore and the receiving bore.

21. The de-coupling mechanism of claim 10, wherein each of the longitudinal channel and the stepped portion are coaxially aligned with respect to a longitudinal axis of the de-coupling mechanism.

22. The de-coupling mechanism of claim 10, wherein the initiator receiving passage is in communication with a longitudinal passage via the connecting passage.

23. The de-coupling mechanism of claim 10 wherein the connecting passage has a smaller diameter than the initiator receiving passage.

24. The de-coupling mechanism of claim 23 wherein the smaller diameter of the connecting passage meets a larger diameter of the connecting passage to form the edge.

* * * * *